(12) United States Patent
Cord

(10) Patent No.: US 7,695,007 B2
(45) Date of Patent: Apr. 13, 2010

(54) DEVICE FOR DEPLOYMENT OF AN ELEMENT, PARTICULARLY A SAFETY ELEMENT, FOR THE PROTECTION OF GOODS AND/OR PEOPLE

(76) Inventor: Paul-Philippe Cord, 4bis rue de Chateaudun, F-75009 Paris (FR)

( * ) Notice: Subject to any disclaimer, the term of this patent is extended or adjusted under 35 U.S.C. 154(b) by 161 days.

(21) Appl. No.: 10/301,972

(22) Filed: Nov. 22, 2002

(65) Prior Publication Data

US 2003/0101893 A1 Jun. 5, 2003

Related U.S. Application Data

(63) Continuation of application No. PCT/FR01/01612, filed on May 23, 2001.

(30) Foreign Application Priority Data

| May 24, 2000 | (FR) | .................................... 00 06642 |
| May 24, 2000 | (FR) | .................................... 00 06643 |
| Feb. 20, 2001 | (FR) | .................................... 01 02273 |
| Feb. 20, 2001 | (FR) | .................................... 01 02274 |

(51) Int. Cl.
*B60R 21/16* (2006.01)
*C06B 31/28* (2006.01)

(52) U.S. Cl. ....................................... 280/734; 149/46
(58) Field of Classification Search ................. 102/530; 280/734; 149/46
See application file for complete search history.

(56) References Cited

U.S. PATENT DOCUMENTS

| 3,663,035 | A | * | 5/1972 | Norton ........................ 280/734 |
| 3,771,451 | A | * | 11/1973 | Woodring .................... 102/430 |
| 3,862,866 | A | * | 1/1975 | Timmerman et al. .......... 149/21 |
| 4,109,578 | A | * | 8/1978 | Goetz .......................... 102/531 |
| 4,998,751 | A | * | 3/1991 | Paxton et al. ............... 280/741 |
| 5,397,543 | A | * | 3/1995 | Anderson .................... 422/165 |
| 5,408,759 | A | * | 4/1995 | Bass ............................ 34/104 |
| 5,480,618 | A | * | 1/1996 | Calsson et al. .............. 422/164 |
| 5,507,890 | A | * | 4/1996 | Swann et al. ................... 149/16 |
| 5,655,790 | A | | 8/1997 | Faigle et al. |
| 5,660,412 | A | * | 8/1997 | Renfroe et al. .............. 280/737 |
| 5,711,546 | A | * | 1/1998 | Hamilton et al. ............ 280/736 |
| 5,762,368 | A | * | 6/1998 | Faigle et al. ................ 280/737 |
| 5,868,424 | A | * | 2/1999 | Hamilton et al. ............ 280/741 |
| 5,883,330 | A | * | 3/1999 | Yoshida ....................... 149/83 |
| 5,897,136 | A | | 4/1999 | Okada |

(Continued)

FOREIGN PATENT DOCUMENTS

DE 199 12 540 A1 9/2000

(Continued)

*Primary Examiner*—Aileen Felton
(74) *Attorney, Agent, or Firm*—DLA Piper LLP (US)

(57) ABSTRACT

A device for deploying an element including a detonatable charge formed from at least one primary pyrotechnic compound; at least one initiator equipped with a reinforcing charge to initiate decomposition of the primary pyrotechnic compound(s); a secondary compound having a decomposition rate less than the decomposition rate of the primary pyrotechnic compound(s) such that the primary pyrotechnic compound(s) control(s) decomposition of the secondary compound(s) after initialization of decomposition; and at least one unconfined or weakly confined interaction chamber wherein the primary pyrotechnic compound(s) enable(s) at least one interaction of combustion products of the reducing primary compound(s) and oxidizing secondary compound(s) by oxidoreduction reaction.

16 Claims, 7 Drawing Sheets

U.S. PATENT DOCUMENTS

| | | | |
|---|---|---|---|
| 5,938,235 A * | 8/1999 | Butt | 280/737 |
| 6,143,103 A * | 11/2000 | Ryder | 149/46 |
| 6,149,193 A * | 11/2000 | Canterberry et al. | 280/741 |
| 6,158,348 A * | 12/2000 | Campoli | 102/443 |
| 6,237,950 B1 * | 5/2001 | Cook et al. | 280/736 |

FOREIGN PATENT DOCUMENTS

| | | |
|---|---|---|
| EP | 0 480 085 A1 | 4/1992 |
| EP | 0 673 809 A1 | 9/1995 |
| EP | 0 728 630 A1 | 8/1996 |

\* cited by examiner

DEVICE FOR DEPLOYMENT OF AN ELEMENT, PARTICULARLY A SAFETY ELEMENT, FOR THE PROTECTION OF GOODS AND/OR PEOPLE

RELATED APPLICATION

This is a continuation of International Application No. PCT/FR01/01612, with an international filing date of May 23, 2001, which is based on French Patent Application Nos. 00/06642, filed May 24, 2000, 00/06643, filed May 24, 2000, 01/02273, filed Feb. 20, 2001, and 01/02274, filed Feb. 20, 2001.

FIELD OF THE INVENTION

This invention pertains to the field of devices for deployment of an element, particularly a safety element, for the protection of goods and/or people. The invention pertains more particularly to a device for deployment of a safety element notably for the protection of at least one occupant of a vehicle.

BACKGROUND

Known in the prior art for impact absorption to protect the occupants of vehicles are essentially three types of devices:

1. Gas generators based on pure combustion of a generally solid pyrotechnic compound such as described in U.S. Pat. No. 3,865,660 and FR 2 730 965. The combustion of this type of propellant generates dust particles which are harmful to the airbag and to the comfort and health of the vehicle occupant(s). To improve the operation of such devices equipped with a solid propellant, EP 0 480 085 and EP 0 728 630 propose placing on the surface of the solid propellant bands of ignition pyrotechnic materials. On the other hand, EP 0 420 726 uses a propellant based on nitrocellulose that doesn't generate dust particles, but rather carbon monoxide, an inflammable toxic gas. It is also known, notably from application no. FR 2 682 374, that the decomposition products of a propellant of the double-base type can be oxidized by potassium perchlorate. However, as in the previously cited cases, the disadvantages of such a configuration are in particular to drastically raise the temperature of the gas and to generate very hot dust particles.

2. Gas generators based on combustion of a pyrotechnic compound provide for the heating of a neutral gas stored under pressure, referred to as hybrid generators such as the one described in U.S. Pat. No. 5,022,674. As in the preceding cases, the combustion of the pyrotechnic compound generates a large quantity of dust.

3. Hybrid gas generators whose products of the combustion of the pyrotechnic compound react with the oxygen stored in the compressed gas, referred to as reactive hybrid generators, such as the one described in application no. EP 0 673 809. In this case, the use of a propellant based on nitrocellulose or LOVA-type powder makes it possible to generate dust-free gas. However, combustion of the reaction products creates an excessive pressure in the structure of the gas generator which consequently must be reinforced.

The device corresponding to application no. GB 2,292,788 performs combustion downstream of the stored-gas chamber. However, since the post-combustion gas flows are not controlled, the characteristics of the generated gas (flow rate, composition, temperature) are not constant during deployment of the system and, thus, are not optimized. This technology allows use of other types of combustible compounds such as magnesium on an organic substrate as cited in U.S. Pat. No. 5,655,790. In this case, the generation of reducing entities is not regulated as in the case of propellants and functioning is similar to that of gas generators constituted of combustible gaseous mixtures the functioning of which corresponds to emptying a reservoir under very high pressure. Such examples are moreover described as examples in U.S. Pat. Nos. 5,460,406, 5,897,136 and EP 0 978 423.

Numerous studies have been carried out with the objective of formulating propellants, the oxidant source of which is ammonium nitrate. U.S. Pat No. 6,123,790 is an example. These propellants have the drawbacks of being difficult to ignite, having slow combustion rates at moderate pressures, of being hygroscopic and exhibiting aging of their mechanical properties which is difficult to control. With the same objective, U.S. Pat. No. 5,868,424, WO 00/32447 and WO 00/46079 describe pyrotechnic charges constituted of ammonium nitrates and propellant grains based on nitrocellulose or of the LOVA type. In this case, the combustion of the pyrotechnic charge requires a strong confinement which is obtained either in an expeller or in a high-pressure tube. In both cases, as soon as the pressure markedly decreases, the combustion rate is annihilated.

Also known in the prior art for particular applications are devices for deployment of a safety element that use compressed gas sources.

The major drawback of the devices for deployment of a safety element of the prior art that use compressed gas sources is the fact that this source must be confined in a reinforced container which is permanently subjected to overpressure until the deployment of the safety element.

SUMMARY OF THE INVENTION

This invention relates to a device for deploying an element including a detonatable charge formed from at least one primary pyrotechnic compound; at least one initiator equipped with a reinforcing charge to initiate decomposition of the primary pyrotechnic compound(s); a secondary compound having a decomposition rate less than the decomposition rate of the primary pyrotechnic compound(s) such that the primary pyrotechnic compound(s) control(s) decomposition of the secondary compound(s) after initialization of decomposition; and at least one unconfined or weakly confined interaction chamber wherein the primary pyrotechnic compound(s) enable(s) at least one interaction of combustion products of the reducing primary compound(s) and oxidizing secondary compound(s) by oxidoreduction reaction.

BRIEF DESCRIPTION OF THE DRAWINGS

Better understanding of the invention will be obtained from the description presented below for purely explanatory reasons of one mode of implementation of the invention with reference to the attached figures.

DETAILED DESCRIPTION

Figure 1:
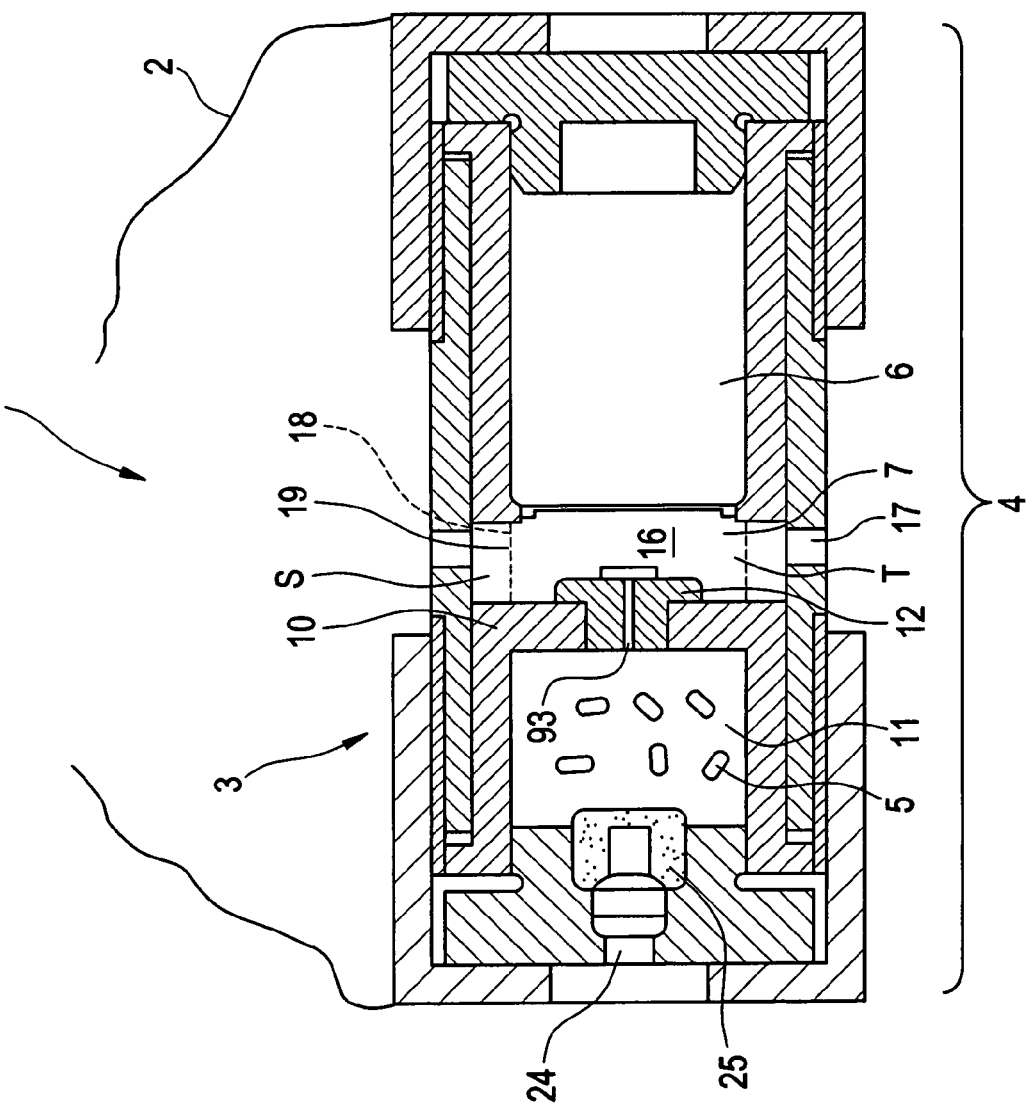
FIG. 1 is a longitudinal sectional view of a first embodiment of the device according to aspects of the invention.

It will be appreciated that the following description is intended to refer to specific embodiments of the invention selected for illustration in the drawings and is not intended to define or limit the invention, other than in the appended claims.

The invention resolves the drawbacks of the prior art by providing a hybrid reactive generator with reduced mass and dimensions.

According to the invention, the secondary compound(s) has(have) a decomposition rate clearly less than the decomposition rate of the primary pyrotechnic compound(s) such that the primary pyrotechnic compound(s) control(s) the decomposition of the secondary compound(s) after initialization, the primary pyrotechnic compound(s) enabling at least one interaction of the combustion products of the primary reducing and secondary oxidizing compounds by oxidoreduction reaction in at least one unconfined or weakly confined interaction volume of the gas generation system.

A "detonatable charge" is understood to be a set of constituents that can produce one or more exothermal chemical reactions during which gases are produced over a very brief lapse of time. According to the invention, the primary and secondary compounds, as well as their reaction products, constitute the detonatable charge.

A "weakly confined volume" is understood to be a volume such that the pressure of the reacting gases in this volume is preferably lower than several megapascal (MPa), which is significantly lower than that of the combustion chambers of the prior art.

An "interaction of the products of combustion of the primary compound(s) and secondary compound(s)" is understood to be a physical reaction and at least partially a chemical oxidoreduction reaction.

The primary pyrotechnic compound(s) is(are) a propellant or a pyrotechnic composition whose gaseous decomposition products are partially constituted of reducing chemical entities and the secondary compound generates oxidizing gaseous entities.

When the secondary compound(s) is(are) solid, it(they) are packaged in an unconfined or weakly confined chamber called a "reaction chamber" which is also the site of the oxidoreduction reaction or post combustion.

In the configurations of the invention, there is at least one primary pyrotechnic compound which controls the decomposition of at least one secondary compound. The advantage of this configuration is that the performance of the secondary compound, and thus of the generator, is dependent solely on the functional characteristics of the primary compound.

Moreover, it is the secondary compound(s) that generate(s) the greatest part of the generator gases. Furthermore, the relative ratio of the primary compound(s) and secondary(s) allows, even in the case of post combustion, an adjustment of the final temperature of generator gases. In fact, an excess of secondary compound in relation to the stoichiometric amount allows this adjustment.

In relation to the solutions of the prior art operating under high pressure, the advantage of weak confinement is to reduce the mass and cost of the structure, delivering dust-free gases at moderate speed, and thus less aggressive for the airbag. Another advantage is the safety of such a system, the mass and confinement of the explosive substances being weaker, the operations of production, transport and storage are facilitated as are those of recycling at the end of its life.

Four embodiments of implementation have been selected to illustrate the invention.

In a first embodiment, the primary pyrotechnic compound(s) is(are) positioned in an expeller and the unconfined or weakly confined interaction volume is constituted of a reaction chamber which is also the site of the oxidoreduction reaction, the chamber being preferably positioned between the expeller and the solid secondary compound.

In a second embodiment, the primary pyrotechnic compound(s) and the solid secondary compound(s) are positioned in at least one cylindrical reaction tube and the unconfined or weakly confined interaction volume is constituted of the reaction tube.

In a third embodiment, the primary pyrotechnic compound(s) is(are) packaged in a container allowing confinement of the compound and essentially radial diffusion of the combustion products.

In a fourth embodiment, the primary pyrotechnic compound(s) is(are) positioned in an expeller comprising at least one tube and the secondary compound(s) are in the form of a gaseous mixture under pressure located in a stored gas reservoir comprising at least one hermetically closed orifice employing a closure, the relative position and the geometric characteristics of the tube(s) and the orifice(s) are such that they enable regulation of the flow of the produced gases.

The applications of such a deployment device for an element, particularly a safety element, are numerous: the safety element can comprise a flexible or rigid structure intended to be inflated by the effect of pressurization or comprise a piston structure actuated by a propulsive effect.

All of the embodiments of the gas generator advantageously enable perfect control of the chemical composition and temperature of the gases as well as the kinetics of their expulsion from the gas-generation system to inflate a flexible or rigid structure or trigger of a piston structure of the screw jack type.

In all of the embodiments, moreover, since combustion or decomposition of the secondary compound takes place under weak confinement, the gas-generators have a low propulsion rate and the effects of overpressure in the structure of the gas generator according to the invention are, therefore, considerably less dangerous for the performance and safety of the system than the effects of such overpressure in gas generators of the prior art.

According to the invention, the primary pyrotechnic compound(s) is(are) advantageously constituted of energetic materials having a negative oxygen balance, such as, e.g., those of the nitrocellulose, nitramite or LOVA type, or the energetic materials which are propellants of the type used for inflatable safety airbags, the oxygen balance of which has possibly been adjusted to make it negative.

The gases generated by such propellants associated with those from at least one oxidizing secondary compound such as ammonium nitrate enables post combustion.

Thus, according to a preferred embodiment of the invention, when the principal source of gas is ammonium nitrate, gases generated during deployment contain no solid particles or solid particles in quantities that are greatly reduced compared to quantities of solid particles emitted by the gas generators of the prior art.

The solid secondary compound(s) is(are) constituted principally of ammonium nitrate or its derivatives and/or (a) compound(s) the decomposition of which delivers equivalent products. To obtain these so-called "double" effects, it is possible to employ many different primary pyrotechnic compound(s).

Also advantageously, when the embodiments of the gas generator according to the invention are deployed, the temperature of the gases from the generator can be adjusted. In one of the preferred embodiments of the invention, the secondary compound, such as ammonium nitrate, provides the oxidizing gases required for post combustion of the combustion gases and, moreover, enables supplementary generation of gas bringing all of the gases generated to a desired temperature. Thus, the quantities of energetic materials are adjusted to the strict function required to inflate the inflatable airbag with the strict quantity of gas required and at a predefined temperature. The almost total absence of particles, the temperature and the ejection rates of the gases limit in a very pronounced manner the aggressiveness of the gases compared to the prior art.

Also advantageously, the first, second and third embodiments allow the use of ammonium nitrate in solid form as the principal secondary compound. This compound provides the greatest part of the gases. If stored in an unconfined or weakly confined structure, it has the advantage of limiting the weight of the gas generator. Thus, the envisaged materials, particularly ammonium nitrate, are inexpensive, widely available industrially and have reduced risks for the environment even after the end of the gas generator's life.

An important advantage of the second and third embodiments of the invention is to allow placement of the gas generator inside the flexible or rigid structure intended to be inflated. This advantage finds applications in the implementation of chest and curtain airbags.

Because of its flexibility, it can also be envisaged that the second and third embodiments of the invention can be positioned on a particular element, e.g., to pressurize an inflatable seatbelt.

The invention moreover can use in the gas generator of the second embodiment a two-component entity formed by the propellant and ammonium nitrate. This two-component entity can be in various forms.

Turning now to the drawings, the device (1) according to the invention is a device for deployment of a safety element, in particular for the protection of goods and/or people, and notably for the protection of at least one occupant of a vehicle, of the type comprising a gas generation system (3) connected to said safety element, for example, to an inflatable safety airbag (2), and comprising a detonatable charge (4) formed by at least one primary pyrotechnic compound (5) and one secondary compound (6).

The device according to the invention is characterized in that the secondary compound(s) (6) has(have) a decomposition rate markedly less than the decomposition rate of the primary pyrotechnic compound(s) (5) such that the primary pyrotechnic compound(s) (5) control(s) the decomposition of the secondary compound(s) after initialization. The primary pyrotechnic compound(s) (5) enables at least one interaction of the combustion products of the reducing primary compound(s) and oxidizing secondary compound(s) by oxidoreduction reaction in at least one unconfined or weakly confined interaction volume (7) of the gas generation system (3).

As noted above, the decomposition rate of the secondary compound is markedly less than that of the primary compound. This latter compound transfers sufficient energy to control its decomposition. There is thus a veritable homothetetic transformation between the yield of the primary compound and that of the secondary compound. The primary compound enables control of the duration of operation of the gas generator, whereas the secondary compound is the principal source of generated gas. Moreover, in a preferred embodiment of the invention, the primary pyrotechnic compound(s) (5) is(are) constituted principally of energetic materials having a negative or zero oxygen balance and the secondary compound has a positive oxygen balance. Post combustion makes it possible to obtain a substantially homogeneous temperature of the gases which is optimal for operation.

Thus, the temperature of the gases formed and the kinetics of their expulsion out of the gas generation system (3) for inflating, for example, an inflatable safety airbag (2), are well controlled during the entire duration of inflation.

In a preferred embodiment of the invention, the primary pyrotechnic compound (5) is constituted of at least one propellant and in the first three embodiments of the invention, the solid secondary compound (6) is(are) constituted principally of ammonium nitrate or its derivatives or (a) compound(s) whose decomposition yields equivalent products.

The secondary compound(s) (6) can comprise at least one energetic binder, such as, e.g., nitrocellulose, or a non-energetic inert binder such as, for example, an epoxy binder; the secondary compound(s) can also be at least partially coated by a protective organic film.

The secondary compound(s) (6) can moreover comprise ballistic additives to facilitate their decomposition, such as mineral oxides, such as, e.g., chromium or copper oxides, alkaline nitrates or alkaline-earth nitrates, in a proportion preferably limited to about 15% by mass.

These additives can also contribute to the mechanical strength of the secondary compound (6) during its life.

The invention also enables rapid pressurization of the inflatable safety airbag (2) and maintenance of the pressurized state beyond about 0.1 second for protection at the chest level for several seconds for curtain-type implementations.

In the first three embodiments, the secondary compound(s) is(are) in the form of a solid compound.

In a first embodiment illustrated in FIG. 1, expeller (10) comprises an initiator (24), equipped with a reinforcing charge (25), at least one storage chamber (11), inside which the primary pyrotechnic compound (5) is positioned, and at least one outlet orifice (93) of the tube type. This outlet orifice is, of course, kept closed, e.g., by means of a cap (12), until the deployment of the device (1) upon impact.

In the generator illustrated in FIG. 1, the reaction chamber (16), which is also the post-combustion site, is positioned between the expeller (10) and the chamber containing the secondary compound (6), but it is also possible to make the gas generator such that the gases stemming from the expeller (10) traverse the chamber containing the secondary compound (6) and that the reaction chamber (16) is positioned after the chamber containing the secondary compound (6).

Figure 2:
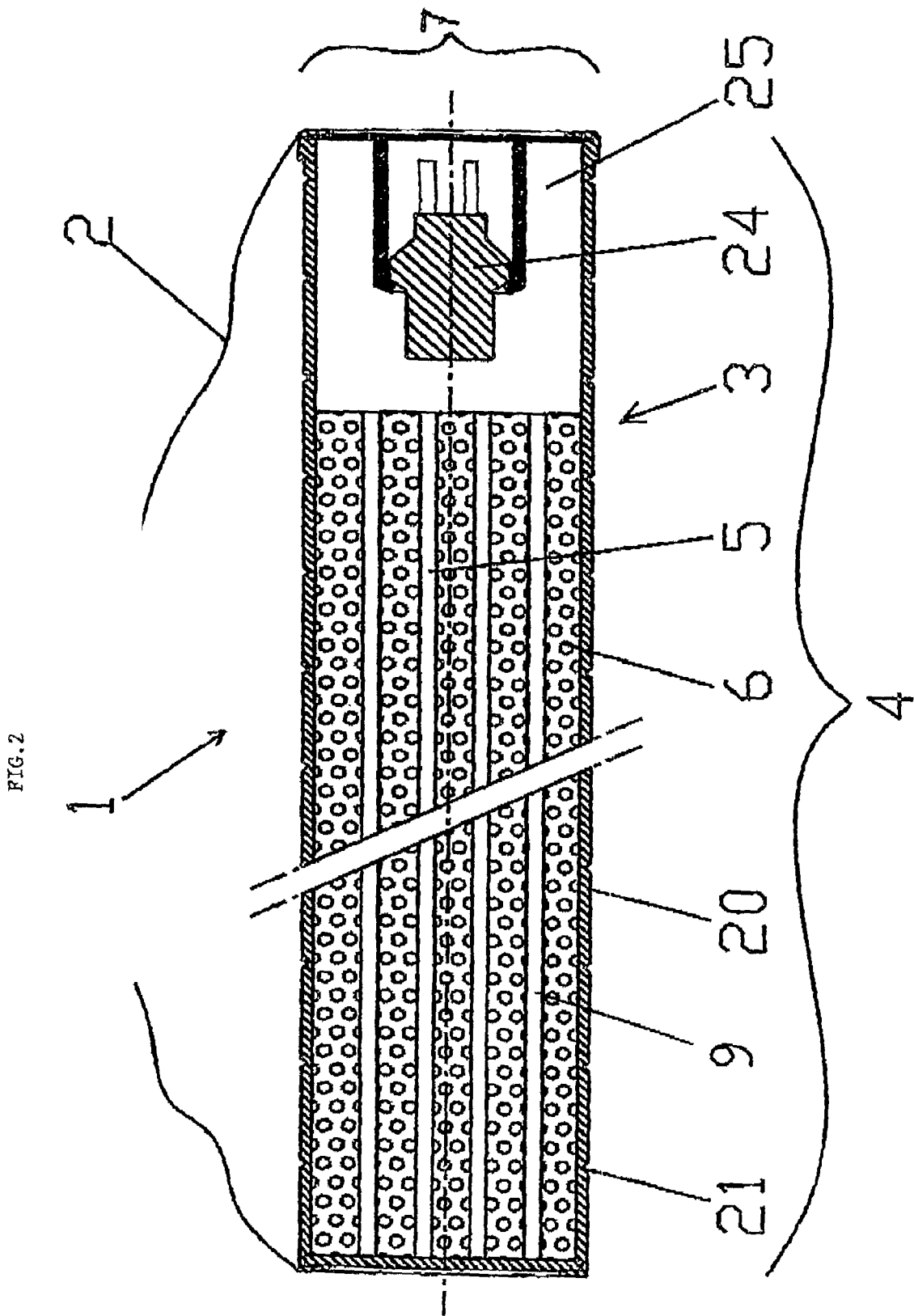
FIG. 2 is a longitudinal sectional view of a second embodiment of the device according to aspects of the invention in which the primary pyrotechnic compound and the secondary compound are in the form of a two-component entity.

In a second embodiment illustrated in FIG. 2, the primary pyrotechnic compound(s) (5) and the solid secondary compound(s) (6) are positioned in at least one substantially cylindrical reaction tube (20) and the unconfined or weakly confined interaction volume (7) is constituted of the reaction tube (20).

Figure 5:
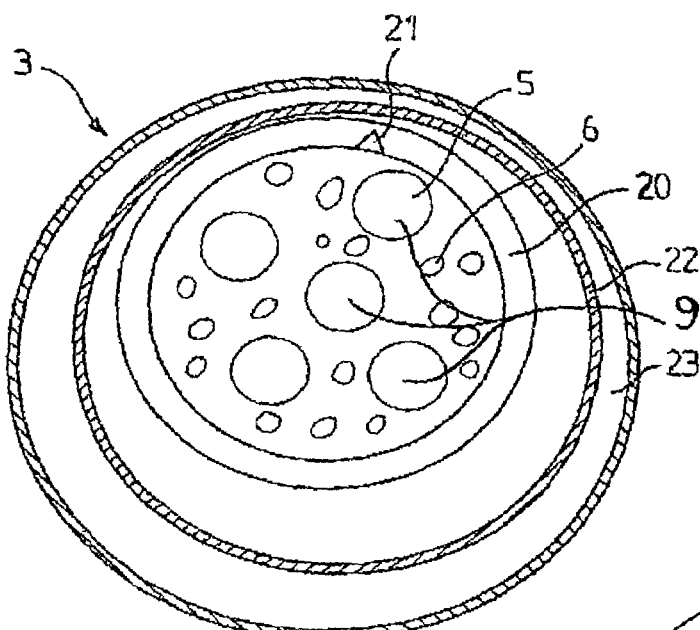
FIG. 5 is a cross-sectional view of a particular version of the second embodiment of the device according to the invention.

The high-pressure reaction tube (20) is positioned in a porous tube constituting a secondary reaction chamber (22) as illustrated in FIG. 5. The initiator (24) is equipped with a reinforcing charge (25). The opening of the reaction tube (20) is preferably programmed by rupture detonators (21).

Upon deployment, the increased pressure opens the reaction tube from these rupture detonators and the secondary reaction tube maintains a moderate pressure to possibly enable prolonging the gas generation. The reaction tube (20) can moreover have a cylindrical stabilization chamber (23) comprised, e.g., by another tube or a cloth bag.

This second embodiment moreover enables implementation of a protective device having an essentially slender form and which can be placed, e.g., in an inflatable lateral safety airbag (2) above a door.

In the second embodiment, the primary compound(s) (5) and solid secondary compound(s) (6) can form a homogeneous or heterogeneous monolithic detonatable charge (4). In one version, the two compounds are two propellants of different combustion rates or durations.

When the primary compound(s) (5) and secondary compound(s) (6) form a heterogeneous monolithic detonatable charge (4), the primary pyrotechnic compound(s) is(are) in loose pelletized or non-pelletized form, or in the form of at least one flat or rolled-up film (8), or of at least one strand (9), and said solid secondary compound(s) (6) is(are) in loose pelletized or non-pelletized form, or in the form of at least one flat or rolled-up film, or of at least one strand.

FIG. 5 illustrates a multiplicity of strands (9) of primary pyrotechnic compound (5) positioned inside a secondary compound (6) in loose pelletized or non-pelletized form.

Figure 6:
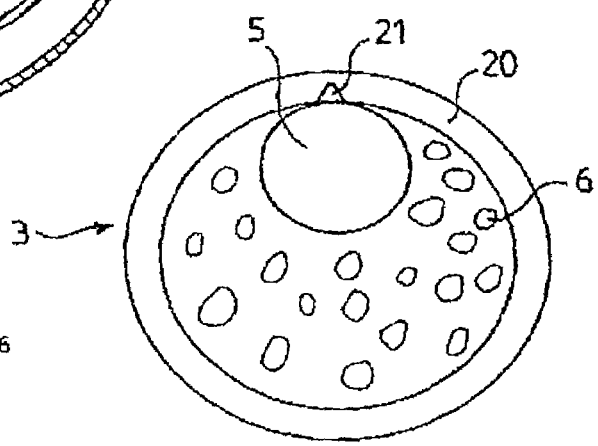
FIGS. 6 to 8 are cross-sectional views of heterogeneous monolithic dual-component entities for implementing the second embodiment.

The solid secondary compound(s) (6) can be positioned at least partially peripheral to the primary pyrotechnic compound(s) (5) as illustrated in FIG. 6 to create a first inflatable safety airbag pressurization effect and a second effect of maintaining the pressure in the inflatable airbag.

Figure 7:
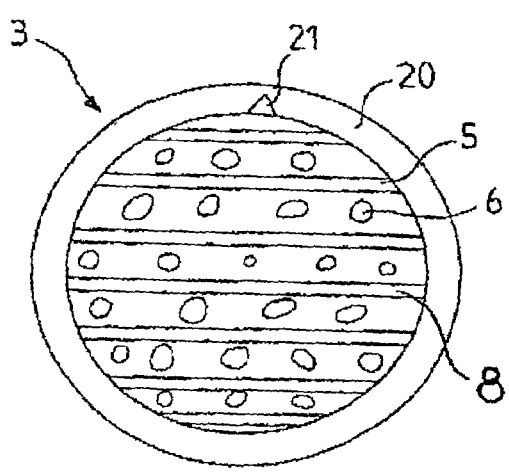
Figure 8:
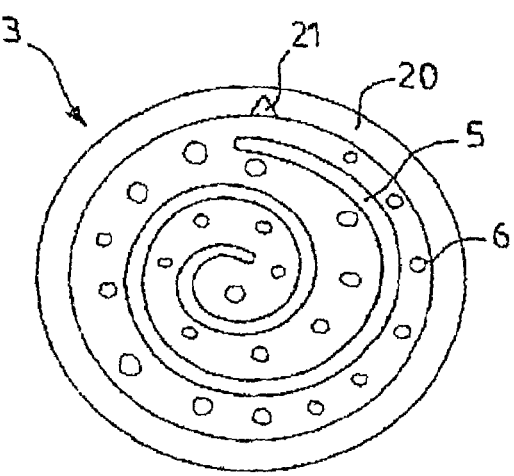

When the primary pyrotechnic compound (5) is made in the form of at least one film (8) and the secondary compound (6) is in loose bulk form, the two-component entity constituted of the primary pyrotechnic compound (5) and the secondary compound (6) can then be in the form of a flat sandwich as illustrated in FIG. 7 or as a rolled-up sandwich as illustrated in FIG. 8.

The primary pyrotechnic compound(s) (5) can be made in the form of a multiplicity of strands (9) having different diameters.

For greater clarity, the secondary reaction tube (22) and the stabilization chamber (23) are not shown in FIGS. 2, 3 and 6 to 8.

Figure 3:
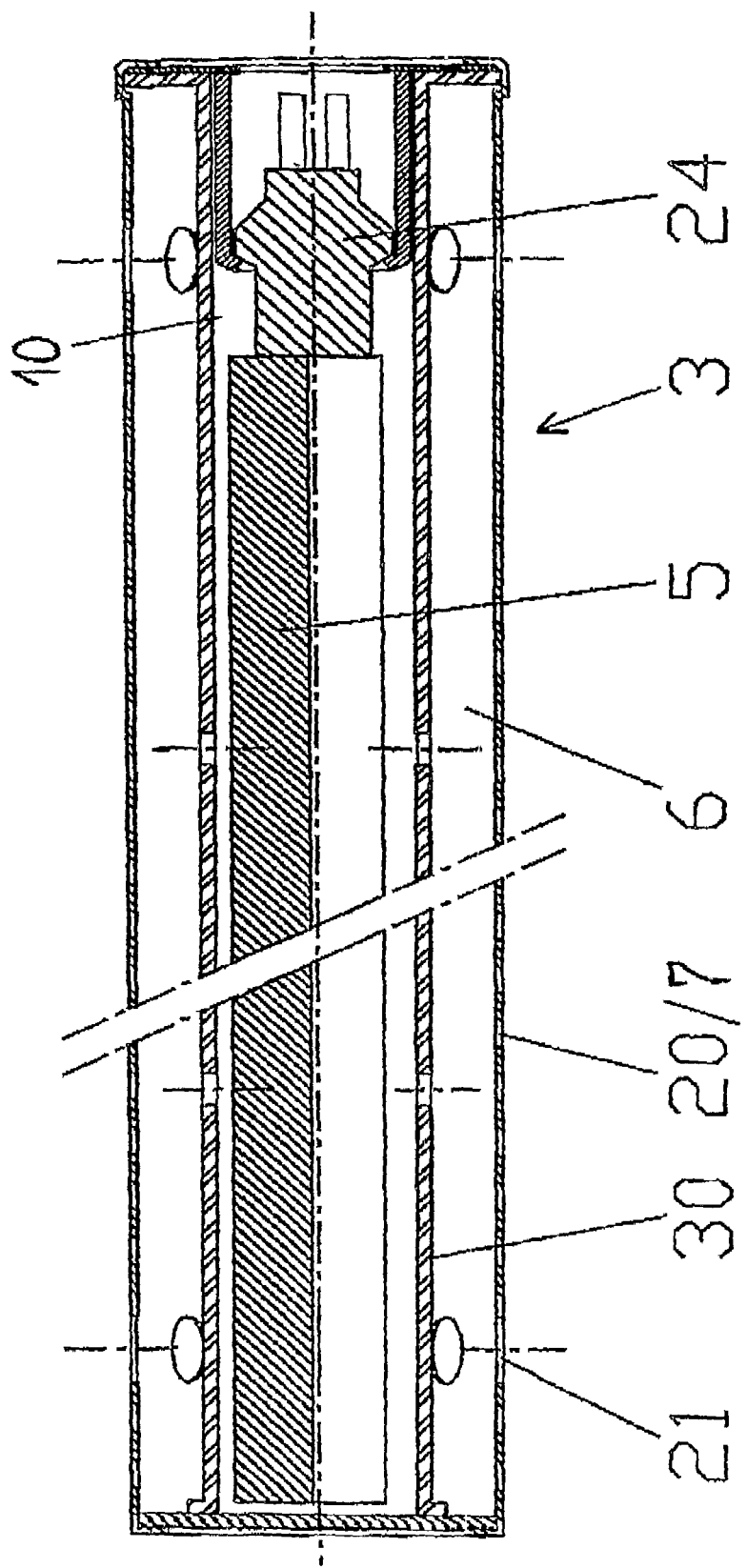
FIG. 3 is a longitudinal sectional view of a third embodiment of the device according to aspects of the invention in which the primary pyrotechnic compound is confined.

In a third embodiment illustrated in FIG. 3, the primary pyrotechnic compound(s) (5) and the solid secondary compound(s) (6) are positioned in at least one cylindrical reaction tube (20) and the unconfined or weakly confined interaction volume (7) is constituted by the reaction tube (20) as in the second embodiment.

Figure 9:
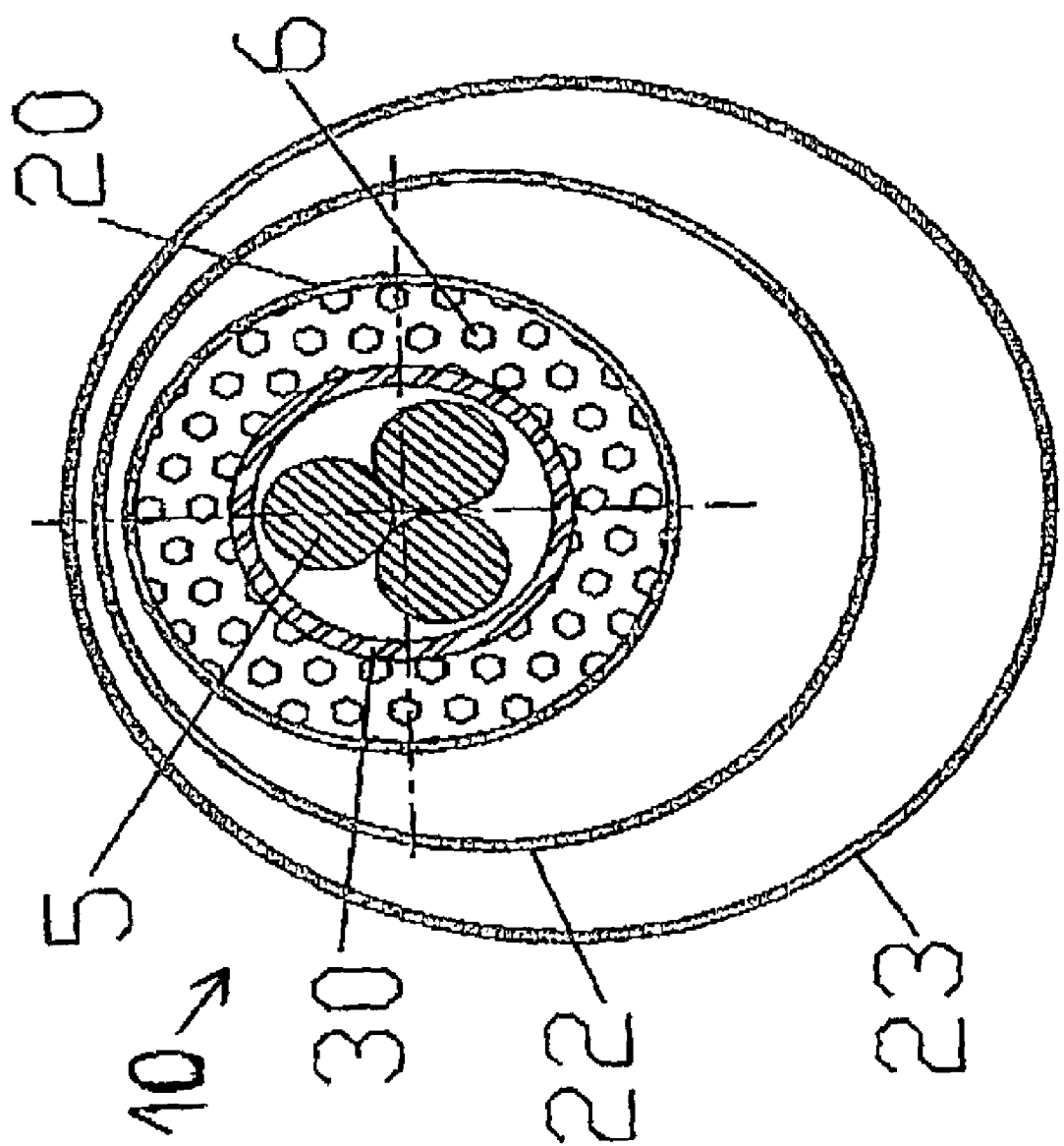
FIG. 9 is a cross-sectional view of a particular version of the third embodiment of the device according to the invention.

The third embodiment differs from the second embodiment essentially in that the primary pyrotechnic compound (5) is packaged in a container (30) enabling confinement of the compound and essentially radial diffusion of the combustion products. The primary compound (5) is packaged in the container (30) formed by a substantially cylindrical tube of small diameter. The secondary compound (6) is packaged around this cylinder in the reaction tube (20). The reaction tube (20) can be positioned in a porous tube constituting a secondary reaction chamber (22) as illustrated in FIG. 9. The reaction tube (20) can moreover have a substantially cylindrical stabilization chamber (23) made, e.g., of another tube or a cloth bag.

This structure enables a high degree of compactness and performance flexibility:

To obtain this double effect, a simple partition in the container (30) enables division of the primary pyrotechnic compound (5). It is not necessary to rigorously separate the secondary compound (6) since its combustion is not autonomous.

Figure 10:
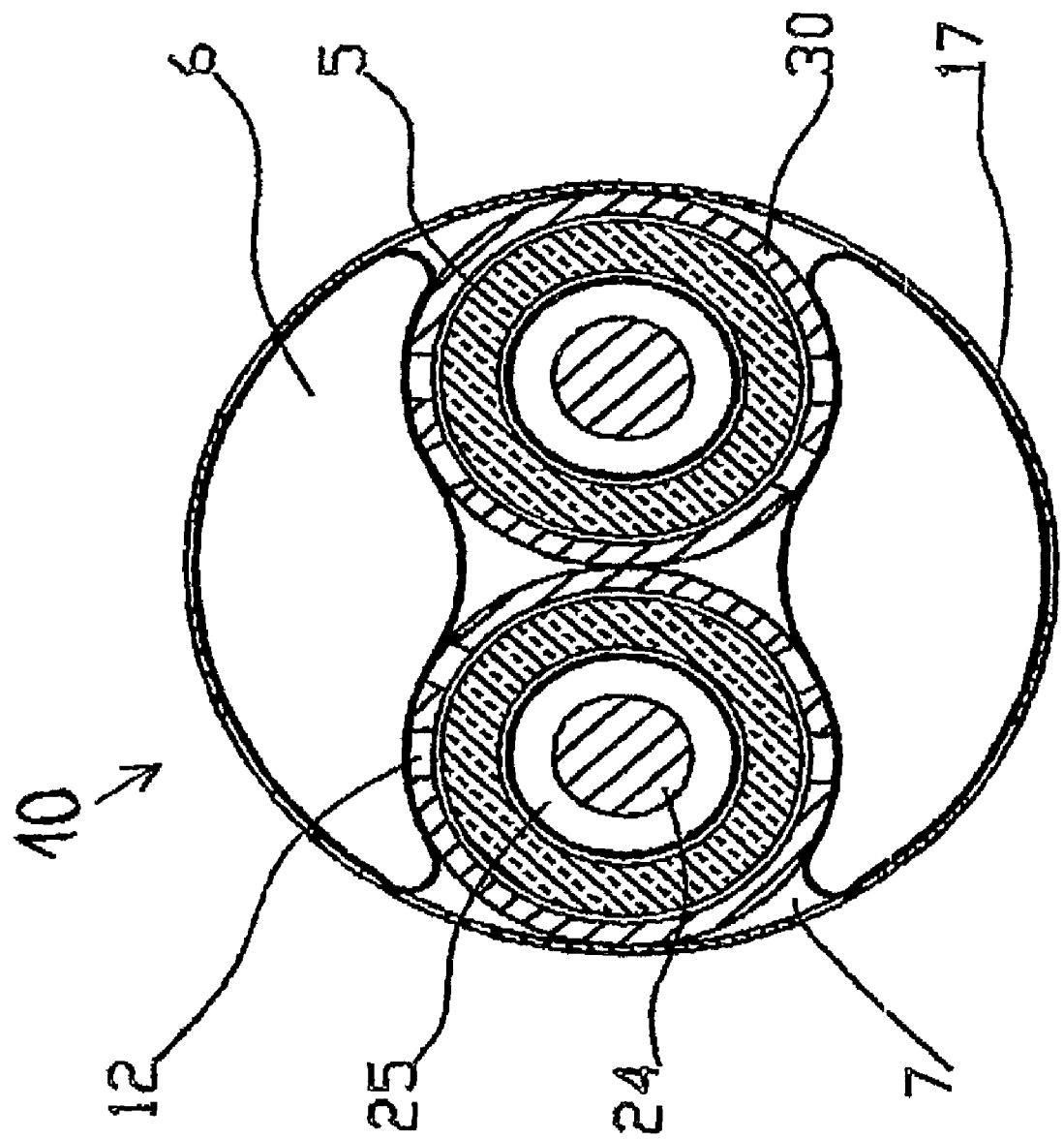
FIG. 10 is a cross-sectional view of another particular version of the third embodiment of the device according to the invention.

The container (30) with the primary pyrotechnic compound (5) can be divided into two expellers mounted substantially in parallel, with the secondary compound (6) distributed in a cylindrical container containing the two expellers as illustrated in FIG. 10.

The primary pyrotechnic compound (5) can also be divided into two separate charges, one fast-acting pressurization charge and the other a slower charge for maintaining the pressurization. In this case, a simple opening in the separation partition, possibly equipped with a retarding device, enables inflation of a curtain type inflatable airbag.

Figure 4:
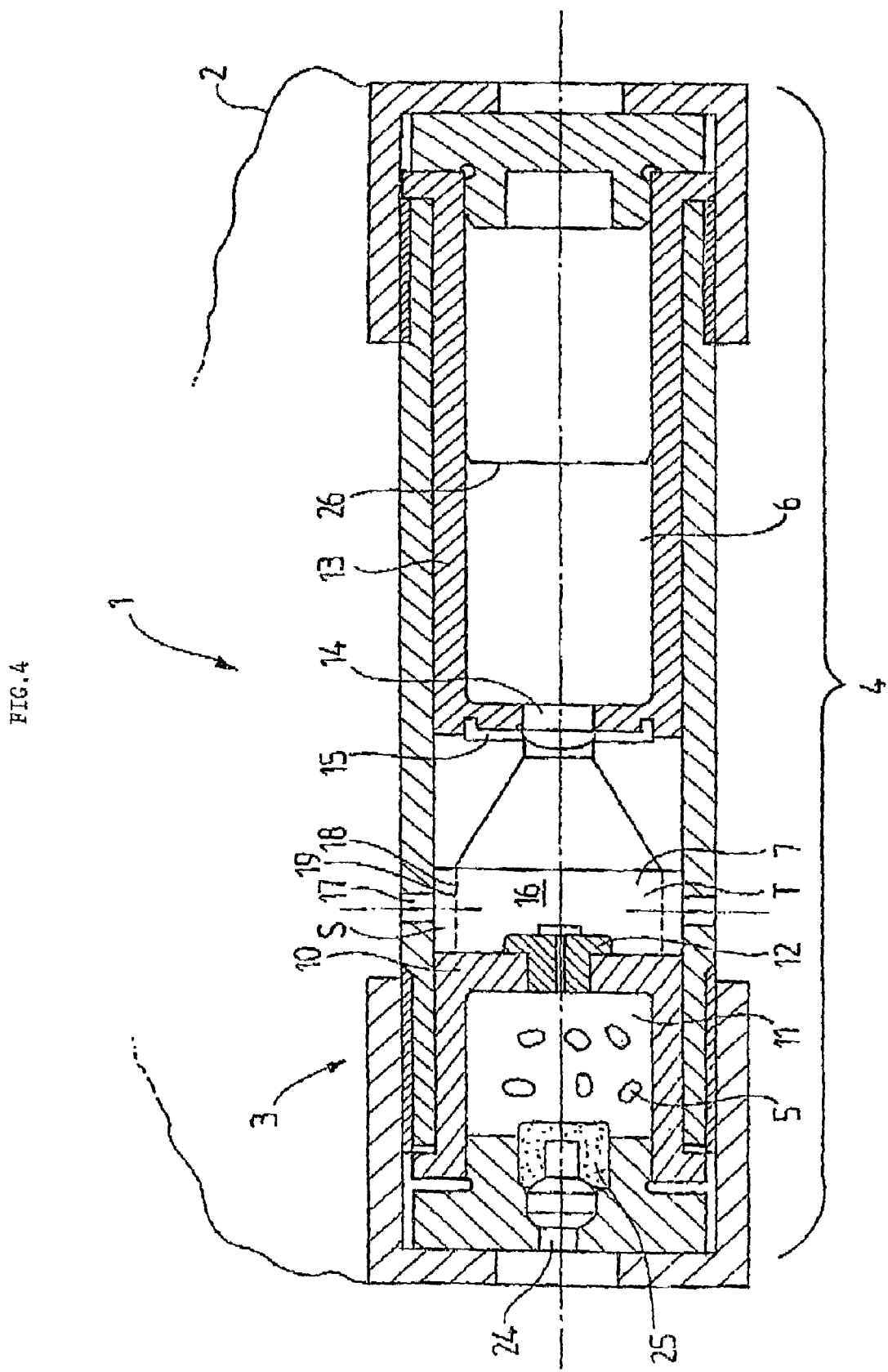
FIG. 4 is a longitudinal sectional view of a fourth embodiment of the device according to the invention.

In a fourth embodiment of the invention illustrated in FIG. 4, the primary pyrotechnic compound(s) (5) being positioned in an expeller (10) comprising at least one tube and the secondary compound(s) (6) being in the form of a gaseous mixture under pressure located in a stored gas reservoir (13) and the unconfined or weakly confined interaction volume (7), is constituted of a reaction chamber (16) positioned between the expeller (10) and the stored gas reservoir (13). The expeller (10) is of the same type as that of the first embodiment.

In this fourth embodiment, the stored gas reservoir (13) has at least one orifice (14) hermetically closed by a closure (15), the stored gas reservoir (13) being intended upon rupture of the closure (15) to enable release of the stored gases. These gases then perform post combustion of the gases from the primary compound (5) and participate in the inflation of the inflatable airbag (2). The dimensions of this orifice and its distance from the tube are determined to assure a flow rate from the reservoir adapted to the flow rate of the gases from the pyrotechnic compound (5).

The rupture of the closure (15) is produced either under the effect of the heat of the gases from the expeller or under the mechanical effect of a striking pin projected by the hot gases.

The stored gas reservoir (13) possibly comprises in its interior a fixed or mobile membrane (26) having at least one orifice whose diameter is smaller than that of orifice (14) to maintain pressurization of the inflatable airbag by the outflow of this volume of gas.

The relative position and geometric characteristics of the tube(s) (12) on the one hand and the orifice(s) (14) on the other hand are such that they enable regulation of the flow of the gases produced in the gas reservoir (13).

In the first embodiment, as in the fourth embodiment, the reaction chamber (16) is in communication on the one hand with at least the tube(s) (12) of the expeller (10) and on the other hand with the secondary compound (6) or the orifice(s) (14) of the stored gas reservoir (13). The device (1) has at least one opening (17) for evacuation of the gases produced in communication with the inflatable safety airbag (2).

The opening (17) for the produced gases is preferably an evacuation grate comprising a multiplicity of openings.

In the first, third and fourth embodiments, the pressure difference between the chamber containing the primary pyrotechnic compound (5)—expeller (10) or container (30)—and the unconfined or weakly confined interaction volume (8) is such that the flow through the outlet orifices(s) of the products of combustion of the primary pyrotechnic compound (5) is sonic. The flow rate of the gases emitted by the primary pyrotechnic compound (5) contributes to the control of the decomposition of the secondary compound (6).

In the first, third and four embodiments, the expeller (10) or reaction tube (20) can comprise two storage chambers ((11) or (30), respectively, each containing at least one primary pyrotechnic compound (5), the deployment of the storage chambers (11) or (30) being controlled either separately or the one by the other, possibly with a retarding device.

Furthermore, in the first and fourth embodiments, the unconfined or weakly confined interaction volume (7) can be made of two parts separated by a separation grate (18) comprising a multiplicity of openings (19) to create on the one hand a primary and/or secondary reaction chamber with strong turbulence T close to the orifice (14) of the expeller (10) and on the other hand a stabilization chamber S close to the evacuation opening (17) of the gases produced.

Finally, in the first and fourth embodiments, an excess of secondary compound allows adjustment of the temperature in the bag. Thus, the temperature of the gases formed and the kinetics of their expulsion out of the gas generation system (3) for the inflation, e.g., of an inflatable safety airbag (2), is well controlled during the entire duration of inflation.

The secondary compound(s) (6) can also enable the oxidoreduction reaction of the decomposition products of the primary pyrotechnic compound(s) (5) and a supplementary generation of gas. The secondary compound(s) (6) can, moreover, continue a supplementary generation of gas after the functioning of the primary pyrotechnic compound(s) (5).

For better comprehension of the invention, multiple examples of implementation of a detonatable charge (4) are presented below using as primary pyrotechnic compound (5) either a propellant based on nitrocellulose or nitramite having a negative oxygen balance comprised between about 30% and about 50%, or the type used in inflatable safety airbags with an essentially zero oxygen balance:

The propellants of the ballistic powder type based on nitrocellulose, nitramites or energetic or non-energetic binders, charged in secondary explosives (LOVA), deliver gases containing essentially 50% of toxic inflammable carbon monoxide CO, which must be oxidized.

In the first three embodiments of the invention, the secondary compound (6) is principally ammonium nitrate whose decomposition products contain about 15% oxygen. To obtain an essentially zero oxygen balance of the gases generated in this case, the minimum ratio to be employed is comprised between about 1.5 and about 1.8 grams of ammonium nitrate per gram of propellant. In these configurations, the relative increase in the mass of ammonium nitrate have the effect of increasing the volume of gases formed and of reducing their temperature.

In the fourth embodiment of the invention, the secondary compound (6) is the stored gas which contains about 20% of oxygen $O_2$. To obtain an essentially zero oxygen balance of the gases generated in this case, the ratio to be employed is comprised between about 1.0 and about 1.2 liter of stored gas per gram of propellant.

The examples below illustrate the gain of space and weight that can be obtained with a device according to the invention.

1/—First embodiment: the primary pyrotechnic compound (5) is based on nitrocellulose; the secondary compound (6) is based on ammonium nitrate.

For a 100-liter inflatable airbag, the gas generation system comprises essentially 10 grams of propellant and 18 grams of ammonium nitrate. The decomposition of the ammonium nitrate and the post-combustion reaction take place in the reaction chamber under pressures of essentially 1 to 5 MPa.

The ammonium nitrate can be combined with an organic binder of the epoxy binder type in a proportion of 5% by mass. The performance for 100 liters of generated gas is obtained in this case with 6 grams of propellant and 24 grams of secondary compound.

These devices have the following dimensions: diameter smaller than 40 mm, length smaller than 150 mm and total mass less than 280 g.

2/—First embodiment, excess of secondary compound: the primary pyrotechnic compound (5) is based on nitrocellulose; the secondary compound (6) is based on ammonium nitrate.

The gas generation system comprises essentially 8 grams of propellant and 32 grams of ammonium nitrate. The ammonium nitrite provides the oxidizing entities required for the post combustion of the reducing combustion gases of the propellant and a supplementary volume of gas. The gas volume is greater than 1.5 moles and the temperature of the gases after post combustion is less than 2000° K.

3/—Second embodiment: for a gas generation of an inflatable curtain safety airbag with a volume of 18 liters, 10 grams of propellant are prepared as strands essentially 100 mm in length; 10 grams of the compound containing ammonium nitrate are distributed around these strands in the reaction tube (20).

The diameter of the generator is less than 30 mm, its length is less than 120 mm and its total mass is less than 180 grams.

4/—Third embodiment: the primary pyrotechnic compound (5) is based on nitrocellulose; the secondary compound (6) is based on ammonium nitrate.

The gas generation system comprises 10 grams of propellant packed in a tubular container (30) and 18 grams of ammonium nitrate are distributed around this container in the reaction tube (20).

The double effect is obtained by a partition positioned in the container (30), dividing the charge into two charges initiated on both sides of the tube.

An inflatable airbag passenger-protection device has the following dimensions: diameter less than 30 mm, length less than 120 mm and total mass less than 200 g.

5/—Third embodiment: the primary pyrotechnic compound (5) is based on nitrocellulose; the secondary compound (6) is based on ammonium nitrate.

For the implementation of an 18-liter curtain-type gas generator, the gas generation system comprises a rapid charge of 3 grams of propellant and a slow charge of 2 grams of propellant packaged in the container (30) equipped with a non-tight separation partition enabling initiation of the second charge by the first, possibly with a retarding device. Essentially 9 grams of ammonium nitrate are distributed radially in the reaction tube (20).

The diameter of the generator is less than 30 mm, its length is less than 100 mm and its total mass is less than 150 grams.

For all of the generators, the final temperatures of the gases can be adjusted in relation to the specific requirements by increasing the mass of the secondary compound.

6/—Fourth embodiment: the primary pyrotechnic compound (5) is based on nitrocellulose; the secondary compound (6) is in the form of a gaseous mixture under pressure.

The gas generation system comprises essentially 10 grams of propellant. The gaseous volume of the gas mixture is on the order of 15 liters under normal pressure and temperature conditions; the internal pressure of the reservoir is on the order of 300 bars.

A 100-liter inflatable airbag passenger-protection device has the following dimensions: diameter less than 40 mm, length less than 180 mm and total mass less than 400 g.

7/—Fourth embodiment: the primary pyrotechnic compound (5) is based on nitrocellulose; the secondary compound (6) is in the form of a gaseous mixture under pressure.

The gas-generation system comprises essentially 3 grams of propellant. The gaseous volume of the gas mixture is on the order of 15 liters under normal pressure and temperature conditions; the volume of the stored gas reservoir is on the order of 50 cm$^3$ and the internal pressure is on the order of 30 MPa.

A membrane is installed in the reservoir to delay the diffusion of the pressure-maintenance gases into the bag.

A 18-liter inflatable curtain airbag has the following dimensions: diameter less than 25 mm, length less than 200 mm and total mass less than 350 g.

Excess stored gas reduces the final temperature of the generated gases.

In the case of the deployment of a screw jack for pretensioning safety belts: the combustion of a propulsive powder charge (0.3 to 0.8 g) based on nitrocellulose decomposes an essentially equivalent mass of ammonium nitrate. The ballistic characteristics are unchanged, but the carbon monoxide levels are reduced.

The invention can also be used to deploy a flotation-support device or to create a flotation device. In this latter case, the thermal effect is used to enable the remounting to the surface of an object located underwater and its recovery. For example, a generator containing 10 g pyrotechnic material and providing the equivalent of 10 liters of gas brought under ordinary conditions, allows pressurization of a 10-liter structure by 300 m of depth and, thus, induces the remounting of the product with which it is associated.

The invention has been described above as an example. It is understood that the expert in the field can implement different embodiments of the invention without thereby going beyond the scope of the invention, as defined in the appended claims.

The invention claimed is:

1. A device for deploying an element comprising:
    a first chamber enclosing at least one primary pyrotechnic compound having a characteristic of a ballistic propellant;
    a passageway connected to and extending from the first chamber;
    at least one initiator equipped with a reinforcing charge to initiate decomposition of the primary pyrotechnic compound(s);
    a second chamber enclosing a secondary compound having a decomposition rate less than the decomposition rate of the primary pyrotechnic compound(s), the secondary compound that decomposes in response to decomposition of the primary compound that receives gases generated as a result of a decomposition of the primary pyrotechnic compound(s) as said gases emanate from the first chamber; and
    a weakly confined reaction chamber having a vent opening and positioned between the passageway and the second chamber and in communication with the first and second chambers such that the weakly confined reaction chamber receives combustion products generated as a result of decomposition of the primary pyrotechnic compound (s) and oxidizing gaseous entities generated as a result of decomposition of the secondary compound for at least one post-combustion oxidoreduction reaction between the combustion products and the oxidizing gaseous entities and vents gases generated by the post-combustion oxidoreaction to the element through the vent.

2. The device according to claim 1, wherein the secondary compound(s) is(are) in the form of a solid compound.

3. The device according to claim 1, wherein the primary compound(s) is(are) constituted principally of energetic materials having a negative oxygen balance.

4. The device according to claim 1, wherein the secondary compound(s) is(are) constituted principally of ammonium nitrate.

5. The device according to claim 1, wherein the secondary compound(s) further comprise(s):
    ballistic additives to facilitate decomposition.

6. The device according to claim 1, wherein the secondary compound(s) is(are) coated at least partially by a protective organic film.

7. The device according to claim 1, wherein the secondary compound(s) enable(s) the oxidoreduction reaction of decomposition products of the primary pyrotechnic compound(s) and supplementary generation of gas.

8. The device according to claim 1, wherein the element comprises a flexible structure intended to be inflated by pressurization.

9. The device according to claim 1, wherein the secondary compound(s) is(are) constituted principally of a derivative of a ammonium nitrate whose decomposition produces substantially equivalent products.

10. The device according to claim 1, wherein the secondary compound(s) further comprise energetic organic binders.

11. The device according to claim 1, wherein the secondary compound(s) further comprise non-energetic organic binders.

12. The device according to claim 1, wherein the element comprises a rigid structure intended to be inflated by pressurization.

13. The device according to claim 1, wherein the element comprises a piston structure actuated by a propulsive effect.

14. The device according to claim 1, further comprising an unconfined reaction chamber.

15. The device according to claim 13, wherein the primary pyrotechnic compound(s) is(are) positioned in an expeller and the unconfined interaction chamber is positioned between said expeller and said solid secondary compound.

16. The device according to claim 1, wherein the least one primary pyrotechnic compound has a negative oxygen balance.

* * * * *